Nov. 3, 1964     O. C. NIEDERER, JR., ET AL     3,155,102
EGG CLEANING EQUIPMENT
Filed March 12, 1962     2 Sheets-Sheet 2
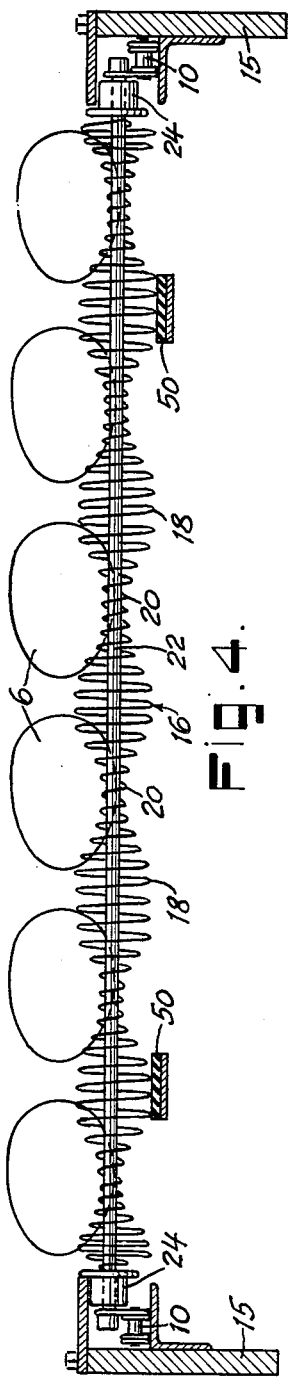
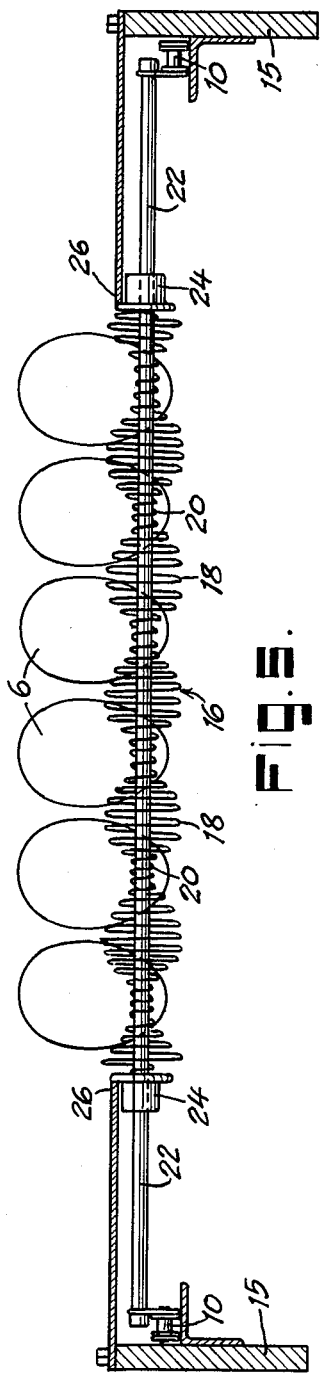
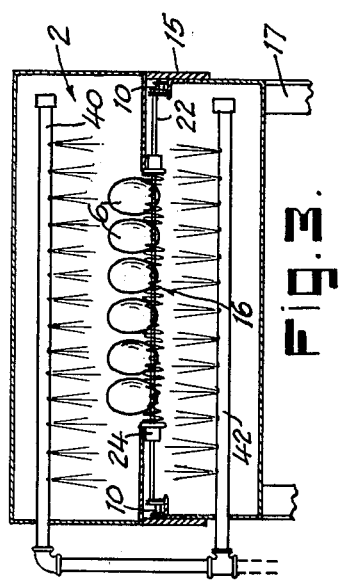
INVENTORS
OTTO C. NIEDERER JR.
BY HERBERT O. NIEDERER
Albert Sperry
ATTORNEY 3,155,102
EGG CLEANING EQUIPMENT
Otto C. Niederer, Jr., Bear Tavern Road, and Herbert O. Niederer, Church Road, both of Titusville, N.J.
Filed Mar. 12, 1962, Ser. No. 179,050
13 Claims. (Cl. 134—72)

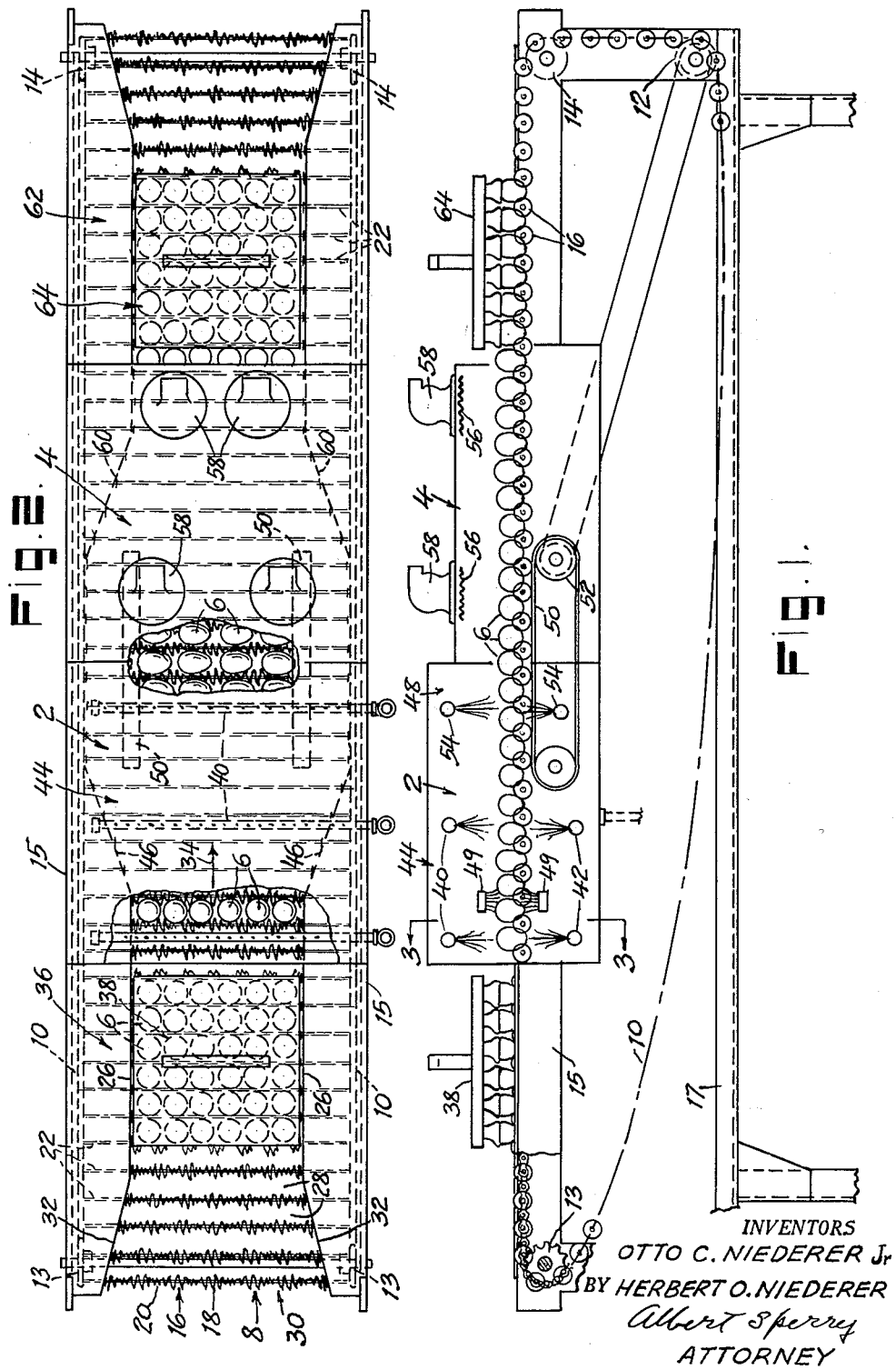

This invention relates to egg cleaning equipment and is directed particularly to constructions wherein eggs may be effectively washed and dried while they are carried by conveying means.

It has been common practice heretofore to clean eggs by spraying water or a washing liquid onto the eggs while they are supported on a conveyor or other means movable through a washing chamber and a drying chamber. In some instances, the egg cleaning equipment also includes brushes or other elements which rotate, reciprocate or otherwise contact the eggs during the cleaning operation. The eggs being cleaned are frequently supported on parallel rollers or spools and are arranged with their long axes horizontal and parallel to the rollers. However, it is then difficult to clean the ends of the eggs effectively. On the other hand, when the eggs are arranged with their long axes vertical it is not always possible to clean the sides and lower ends of the eggs effectively; and a final drop of water always tends to adhere to the lower end of the egg and is difficult to remove.

In accordance with the present invention, these objections and limitations of prior egg washing equipment are overcome, and novel methods and means for washing and drying eggs are provided. Such means preferably include supporting means for the eggs which are movable to receive eggs arranged in one positon and in predetermined spaced relation and to shift or cause the eggs to move to other positons or arrangements assuring complete and uniform cleaning and drying of the eggs carried by the conveyor.

In order to accomplish these results, it is preferable to employ a conveyor or egg supporting means of the type illustrated and described in our copending application Serial No. 170,768, filed February 2, 1962. Such a conveyor embodies coil spring members arranged with their axes parallel and cooperating to present egg receiving cavities which are relatively close together and adapted to support eggs with their long axes vertical when the spring members are suitably compressed. However, when the coiled spring members are expanded, the egg receiving cavities are elongated and the spring members may be rotated to cause the eggs to assume positions wherein their long axes are horizontal and parallel to the axes of the supporting spring members. At the same time, the egg supporting means are open or reticulated so as to permit relatively free flow of washing liquid and air through the egg supporting means and into and out of contact with eggs carried thereby.

When using such supporting means for the eggs to be cleaned, the eggs may be deposited on the conveying means by conventional egg lifting means and may be held with their long axes vertical and in relatively closely spaced relation. When so positioned, the eggs may be sprayed with cleaning liquid and contacted with brushes or the like whereby the ends of the eggs may be cleaned very effectively. Thereafter, the coiled spring supporting means may be elongated and rotated to cause the eggs to assume horizontal positions wherein the sides of the eggs may be further washed and cleaned.

In a similar way, the eggs may be dried by blowing dry or heated air over the washed eggs when they are in a horizontal position and preferably while being rotated. Finally, if desired, the coiled spring supporting means may be compressed to position the eggs relatively close together and to arrange the long axes thereof vertically for engagement by lifting means to remove the cleaned and dried eggs from the conveyor.

In this way, all portions of the eggs may be suitably contacted with washing liquid, and with brushes when employed, and may be thoroughly dried in a continuous operaton and while using vacuum or mechanical lifting means for depositing eggs on or removing them from the conveyor.

Accordingly, the principal object of the present invention is to clean eggs quickly and effectively with a minimum of handling thereof.

Another object of the invention is to provide means for varying the position of eggs during the cleaning and/or drying thereof.

A specific object of the invention is to provide egg cleaning equipment wherein eggs may be supported and changed in position by coiled spring members while being subjected to the cleaning action of washing liquid and/or brushes and may be dried effectively after the cleaning thereof.

These and other objects and features of the present invention will appear from the following description thereof wherein reference is made to the figures of the accompanying drawings.

In the drawings:

FIG. 1 is a diagrammatic longitudinal sectional view through a typical form of egg cleaning equipment embodying the present invention;

FIG. 2 is a top plan view of the cleaning equipment illustrated in FIG. 1 with parts broken away;

FIG. 3 is a transverse sectional view of the equipment illustrated in FIG. 1 taken on the line 3—3 thereof; and FIGS. 4 and 5 are vertical sectional views illustrating two alternative positions of the egg supporting members and eggs which are encountered in using the equipment of FIG. 1.

In that form of the invention chosen for purposes of illustration in the drawings, the egg washing equipment embodies a washing chamber 2 and a drying chamber 4 through which the eggs 6 are moved by means of a conveyor 8. The conveyor preferably embodies two side chains 10 which pass about the driven sprocket 12 and the idler sprockets 13 and 14 so as to present an upper run of the conveyor which passes through the chambers 2 and 4 and is supported by angle iron members 15 or the like mounted on the frame 17 of the equipment. The lower run of the conveyor may return through the chambers 2 and 4 or exteriorly thereof as desired.

The conveyor preferably embodies egg supporting members 16 which may be of the type shown and described in the above identified copending application for patent. In other words, the egg supporting member 16 may be formed of coiled spring elements having portions 18 of larger diameter than the intermediate portions 20 of the coiled spring members. These members are supported on rods 22 which pass axially through the spring members and are secured at their opposite ends to the chain 10. Flanged rollers 24 are rotatably mounted on the rods 22 at the opposite ends of the spring members 16 and engage guide tracks 26 extending along the inner edges of the plates 15 on which the conveyor chains are supported.

The larger portions 18 and the smaller portions 20 of each spring member are positioned so as to cooperate with the corresponding portions of adjacent egg supporting members to present a plurality of egg receiving cavities 28 extending transversely of the conveyor 8. However, since the spring members are compressible lengthwise, it is possible to vary the shape and the relative positions or spacing of the egg holding cavities 28 so as to facilitate the handling of the eggs and assure the most effective cleaning thereof.

Thus, for example, when the side chains 10 pass about the idler sprocket 13 at the loading end 30 of the equipment, the flanged rollers 24 at the opposite ends of the spring members 16 engage the converging portions 32 of guide tracks 26. Then as the conveyor 8 moves in the direction of the arrow 34, the spring members 16 are compressed sufficiently to cause the egg receiving cavities 28 to be located relatively close together as indicated, for example, in FIG. 5 of the drawings. In this way, the cavities 28 of that portion of the conveyor located in the loading zone 36 of the conveyor may be positioned relatively close together and so arranged that it is possible to employ a vacuum or mechanical type of egg lifting device indicated at 38 to transfer eggs directly from a conventional egg crate to the cavities 28 in the portion of the conveyor in the loading zone 36. Furthermore, the shape and contour of the cavities 28 between the enlarged portions 18 of the spring members 16 will be such as to hold the eggs in vertical positions on the conveyor as they enter the washing chamber 2.

Water or washing liquid can then be sprayed forcibly against the upper ends of the eggs 6 supported in the cavities 28 as shown in FIGS. 1 and 3 by means of spray heads 40. At the same time, the lower ends of the eggs carried by the conveyor will be exposed between the portions 20 of the spring members 16 which are of smaller diameter and which form the egg receiving cavities 28. Accordingly, spray heads 42 may be located beneath the conveyor to project water or washing liquid upwardly against the lower ends of the eggs. In this way, both the upper and the lower ends of the eggs can be effectively cleaned during the initial period of washing and while the eggs are in the zone indicated at 44 in FIGS. 1 and 2.

As the eggs carried by the upper run of the conveyor pass beyond the initial washing zone 44, the opposite ends of the spring members 16 engage the diverging surfaces 46 of the guide tracks 32 so that the spring members may expand to assume the form illustrated in FIG. 4 of the drawings. The egg receiving cavities 28 between the spring members 16 then become relatively elongated and spaced farther apart whereby the eggs supported in the cavities 28 will assume horizontal positions within the cavities and in the final washing zone 48 of the washing chamber 2 of the equipment. The eggs will normally assume positions in which their long axes are horizontal when the egg receiving cavities are elongated. However, in order to aid in shifting the positions of the eggs within the cavities 28 to the desired horizontal positions, the spring members 16 may be positively rotated by suitable means such as the friction belt 50 which may be driven by pulley 52 to engage the enlarged portions 18 of the spring members 16. Rotation of the spring members when the cavities 28 are elongated serves to assure shifting of the eggs from the vertical positions in which they were deposited on the upper run of the conveyor by the lifting means 38 to the horizontal positions of the final washing zone 48. Spray heads 54 may then be located above and below the upper run of the conveyor 8 so as to spray washing liquid forcibly against the sides of the eggs to complete the washing thereof and assure the removal of dirt from all portions of the eggs.

If desired, the eggs being cleaned may be contacted by a reciprocating or rotating brush or other means while in either the initial washing zone 44 or the final washing zone 48 or in both zones. Brushes adapted for such usage are shown at 49 in FIG. 1 and may be positioned and operated in any suitable or preferred manner such as that shown and described in U.S. Patent No. 2,979,746, for example.

After the eggs have been cleaned in this manner, they are carried by the upper run of the conveyor 8 through the drying chamber 4 of the equipment where air heated by suitable means such as the electrical resistance elements 56 is circulated about the eggs by means of blowers 58 or the like. During such drying of the eggs, they are preferably spaced relatively far apart as in the final washing zone 48. In this way, the air can circulate freely about all sides of the eggs and the spring members 16 are preferably rotated to cause any drops of water adhering to the eggs to flow and spread out into a thin film and to present all sides of the eggs to the circulating dry and heated air to insure complete drying of the eggs.

Ordinarily, the eggs will not require any further drying but, if desired, the spring members 16 which form the egg receiving cavities 28 may again be compressed by the converging guide tracks 60 while the eggs are still within the drying chamber 4 of the equipment. In this way, the eggs will again be brought relatively close together and rearranged with their long axes vertical so that the upper and lower ends of the eggs may also be dried by currents of warm dry air directed against the opposite ends of the eggs. In this way, the most effective and complete drying of the eggs is assured.

In any event, when the cleaned and dried eggs pass out of the drying chamber 4 and reach the unloading zone 62, the eggs will be arranged relatively close together with their long axes vertical and can be removed from the conveyor 8 by conventional vacuum lifting means as indicated at 64 in FIG. 1. On the other hand, the converging track portions 60 are not always employed and the eggs may instead be transferred from the conveyor 8 to other egg handling equipment such as egg candlers, egg graders or the like in suitably spaced relation corresponding to the location of the egg receiving cavities 28 when the spring members 16 are fully expanded in the drying chamber 4 of the equipment.

The egg cleaning equipment thus provided serves to assure effective cleaning of all portions of the eggs by direct action of liquid sprays and/or brushes contacting both the ends and the sides of the eggs. Moreover, the eggs are shifted in their positions during the washing and/or drying operation and are dried in such a way as to prevent the accumulation of a drop of liquid on the lower end or any other portions of the cleaned eggs. Rapid and effective washing and drying of the eggs is thus accomplished whereas the eggs can be handled by means of conventional egg lifting devices whereby a large number of eggs can be deposited on the conveyor and removed therefrom in such a way as to increase the capacity of the egg washing equipment materially.

While a specific embodiment of the present invention has been shown in the drawings and described above, it will be apparent that numerous changes may be made in the form, construction and arrangement of the various elements of the combination. In view thereof, it should be understood that the particular form of the invention herein disclosed is intended to be illustrative only and is not intended to limit the scope of the invention.

We claim:

1. Egg washing equipment comprising an egg washing chamber, a conveyor movable in a predetermined direction through said chamber and having yieldable means thereon defining egg receiving cavities, said yieldable means being movable on the conveyor transversely to the direction of movement of the conveyor to alter the shape of said cavities so as to support eggs in either of two alternative positions; namely, a position in which the eggs have their long axes extending substantially vertically, and a position in which the eggs have their long axes extending substantially horizontally, and means for moving said yieldable means transversely of the conveyor to alter the position of eggs carried by the conveyor during its passage through said egg washing chamber.

2. Egg washing equipment comprising an egg washing chamber with egg washing means therein, an egg drying chamber with egg drying means therein, a conveyor movable through said chambers from the egg washing chamber to the egg drying chamber, said conveyor having spring means thereon defining egg receiving cavities, said spring means being movable to alter the shape of said cavities to support eggs in either of two alternative positions; namely, a position in which the eggs have their long axes extending substantially vertically, and a position in which the eggs have their long axes extending substantially horizontally, and means for moving said spring means to alter the shape of said egg receiving cavities and the positions of the eggs therein during passage of said conveyor through said chambers.

3. Egg washing equipment comprising an egg washing chamber with egg washing means therein, an egg drying chamber with egg drying means therein, a conveyor movable through said chambers from the egg washing chamber to the egg drying chamber, said conveyor having coiled spring egg supporting means thereon defining egg receiving cavities, said coiled spring egg supporting means being movable to alter the shape of said cavities to support eggs in either of two alternative positions; namely, a position in which the eggs have their long axes extending substantially vertically, and a position in which the eggs have their long axes extending substantially horizontally, and means for moving said coiled spring egg supporting means while they are within said egg washing chamber to cause eggs supported thereby to be subjected to the action of said egg washing means while in each of said two alternative positions.

4. Egg washing equipment comprising an egg washing chamber with egg washing means therein, an egg drying chamber with egg drying means therein, a conveyor movable through said chambers from the egg washing chamber to the egg drying chamber, said conveyor having egg supporting means thereon embodying pairs of parallel coiled spring elements presenting similarly arranged portions of relatively large diameter and relatively small diameter cooperating to define egg receiving cavities, said coiled spring elements being variable in length to alter the shape of said cavities to support eggs in either of two alternative positions; namely, a position in which the eggs have their long axes extending substantially vertically, and a position in which the eggs have their long axes extending substantially horizontally, and means for varying the length of said coiled spring elements while they are in said egg drying chamber to cause eggs supported thereby to be subjected to the action of said egg drying means while in each of said two alternative positions.

5. Egg washing equipment comprising an egg washing chamber with egg washing means therein, an egg drying chamber with egg drying means therein, a conveyor movable through said chambers from the egg washing chamber to the egg drying chamber, said conveyor having pairs of parallel rods with coiled spring egg supporting means thereon extending transversely of said conveyor and defining egg receiving cavities, said spring egg supporting means being movable to alter the shape of said cavities to support eggs in either of two alternative positions; namely, a position in which the eggs have their long axes extending substantially vertically, and a position in which the eggs have their long axes extending substantially horizontally, and means for moving said coiled spring egg supporting means with respect to said rods while said coiled spring egg supporting means are within each of said chambers to cause eggs to be subjected to the action of said egg washing means while in each of said two alternative positions and to be subjected to the action of said egg drying means while in each of said two alternative positions.

6. Egg washing equipment comprising an egg washing chamber, a conveyor movable through said chamber and embodying a pair of parallel chains, rods extending transversely of the conveyor from one of said chains to the other, coiled spring elements surrounding said rods and presenting upwardly facing surfaces for receiving and supporting eggs to be washed, means for advancing said conveyor through the egg washing chamber, and means within said chamber for spraying washing liquid onto eggs supported by said coiled spring elements while they are located in said chamber.

7. Egg washing equipment comprising an egg washing chamber, a conveyor movable through said chamber and embodying a pair of parallel chains, rods extending transversely of the conveyor from one of said chains to the other, coiled spring elements surrounding said rods and presenting upwardly facing surfaces for receiving and supporting eggs to be washed, means for advancing said conveyor through the egg washing chamber, means within said chamber for spraying washing liquid onto eggs supported by said coiled spring elements while they are located in said chamber, and means for varying the position of eggs supported on said coiled spring elements while the eggs are located within said egg washing chamber.

8. Egg washing equipment comprising an egg washing chamber, a conveyor movable through said chamber and embodying a pair of parallel chains, rods extending transversely of the conveyor from one of said chains to the other, coiled spring elements surrounding said rods and presenting upwardly facing surfaces for receiving and supporting eggs to be washed, means for advancing said conveyor through the egg washing chamber, and means within said chamber for spraying washing liquid onto eggs supported by said coiled spring elements while they are located in said chamber.

9. Egg washing equipment having an egg washing chamber presenting an initial egg washing zone and a final egg washing zone, a conveyor, means for moving said conveyor in a predetermined direction through said chamber and zones, egg supporting means on said conveyor movable transversely to the conveyor in a direction transverse to the direction of movement of the conveyor to either of two alternative positions wherein the egg supporting means serve to support the eggs in either of two alternative positions, in one of which positions the eggs are supported with their long axes substantially vertical and the other of which positions the eggs are supported with their long axes substantially horizontal, means in the initial egg washing zone for holding said egg supporting means in one of said two alternative positions, and means in the final egg washing zone for holding said egg supporting means in the other of said two alternative positions.

10. Egg washing equipment comprising an egg loading station, an egg washing chamber having means therein for washing eggs, an egg drying chamber having means therein for drying eggs, an unloading station, and a conveyor movable in a predetermined direction from said egg loading station through the egg washing chamber and the egg drying chamber to said unloading station, egg supporting means on said conveyor for receiving eggs to be washed and dried, said egg supporting means being movable on the conveyor in a direction transverse to the direction of movement of the conveyor so as to vary the length of the egg supporting means and move eggs supported thereby into and out of predetermined relatively spaced relation transversely of the conveyor, and means located between said egg loading station and said unloading stations for altering the length of the egg supporting means and the relative spaced relation of the eggs transversely of said conveyor during movement of the conveyor from one of said stations to the other.

11. Egg washing equipment comprising an egg loading station, an egg washing chamber, an egg unloading station, a conveyor, means for moving said conveyor from said egg loading station through said egg washing station to said egg unloading station, egg supporting means on said conveyor presenting egg receiving cavities, said egg supporting means being movable transversely of the conveyor into and out of a loading position wherein said egg receiving cavities are arranged in predetermined positions corresponding to the normal positions of eggs in a conventional egg crate, means at said egg loading station for holding said egg supporting means in said loading position, and means located beyond the egg loading station for moving said egg supporting means out of said loading position.

12. Egg washing equipment comprising an egg loading station, an egg washing chamber, an egg unloading station, a conveyor, means for moving said conveyor from said egg loading station through said egg washing station to said egg unloading station, egg supporting means on said conveyor presenting egg receiving cavities, said egg supporting means being movable transversely of the conveyor into and out of a loading position wherein said egg receiving cavities are arranged in predetermined positions corresponding to the normal positions of eggs in a conventional egg crate, means at said egg loading station for holding said egg supporting means in said loading position, and means in said egg washing chamber for moving said egg supporting means out of said loading position.

13. Egg washing equipment comprising an egg loading station, an egg washing chamber, an egg unloading station, a conveyor, means for moving said conveyor from said egg loading station through said egg washing station to said egg unloading station, egg supporting means on said conveyor presenting egg receiving cavities, said egg supporting means being movable transversely of the conveyor into and out of a loading position wherein said egg receiving cavities are arranged in predetermined positions corresponding to the normal positions of eggs in a conventional egg crate, means at said egg loading station for holding said egg supporting means in said loading position, means in said egg washing chamber for moving said egg supporting means out of said loading position, and means adjacent said egg unloading position for moving said egg supporting means back to said loading position.

References Cited in the file of this patent

UNITED STATES PATENTS

| | | |
|---|---|---|
| 2,254,595 | Carroll | Sept. 2, 1941 |
| 2,442,475 | Swanson | June 1, 1948 |
| 2,531,292 | Page | Nov. 21, 1950 |
| 2,537,904 | McAllister | Jan. 9, 1951 |
| 2,632,720 | Perry | Mar. 24, 1953 |
| 2,711,813 | Jordan | June 28, 1955 |
| 2,826,207 | Krupp et al. | Mar. 11, 1958 |
| 2,894,516 | Froehlich | July 14, 1959 |
| 2,979,746 | Willsey | Apr. 18, 1961 |